United States Patent
Takiyama et al.

(10) Patent No.: US 6,663,948 B1
(45) Date of Patent: Dec. 16, 2003

(54) ADDITIVE COMPRISING POROUS CALCIUM PHOSPHATE FOR SYNTHETIC RESINS, AND SYNTHETIC RESIN COMPOSITION

(75) Inventors: Shigeo Takiyama, Hyogo (JP); Mitsunobu Aoyama, Hyogo (JP); Hidemitsu Kasahara, Hyogo (JP); Shiro Minayoshi, Hyogo (JP)

(73) Assignee: Maruo Calcium Company Limited, Akashi (JP)

( * ) Notice: Subject to any disclaimer, the term of this patent is extended or adjusted under 35 U.S.C. 154(b) by 0 days.

(21) Appl. No.: 09/926,043

(22) PCT Filed: Feb. 18, 2000

(86) PCT No.: PCT/JP00/00924
§ 371 (c)(1),
(2), (4) Date: Aug. 20, 2001

(87) PCT Pub. No.: WO00/50510
PCT Pub. Date: Aug. 31, 2000

(30) Foreign Application Priority Data

Feb. 22, 1999 (JP) .............................................. 11-42765

(51) Int. Cl.$^7$ ................................................. B32B 5/16
(52) U.S. Cl. .................... 428/304.4; 423/308; 423/315; 428/319.3; 428/330; 428/402; 428/403; 521/54; 523/218
(58) Field of Search ........................... 428/304.4, 319.3, 428/330, 402, 403; 423/308, 315; 521/54; 523/218

(56) References Cited

U.S. PATENT DOCUMENTS

| | | | |
|---|---|---|---|
| 5,158,756 A | * | 10/1992 | Ogawa et al. |
| 5,279,831 A | * | 1/1994 | Constantz et al. |
| 5,844,022 A | | 12/1998 | Nishioka et al. ............. 523/218 |
| 5,858,318 A | * | 1/1999 | Luo |
| 5,976,687 A | | 11/1999 | Nishioka et al. ............. 428/323 |
| 6,033,780 A | | 3/2000 | Nishioka et al. ............. 428/402 |
| 6,287,530 B1 | | 9/2001 | Aoyama et al. ............. 423/308 |

FOREIGN PATENT DOCUMENTS

| | | |
|---|---|---|
| JP | 07-118011 | 5/1995 |
| JP | 09-025108 | 1/1997 |
| JP | 11-268905 | 10/1999 |
| WO | WO97/03119 | 1/1997 |
| WO | WO98/29490 | 7/1998 |

OTHER PUBLICATIONS

International Search Report dated May 16, 2000.

* cited by examiner

*Primary Examiner*—H. Thi Le
(74) *Attorney, Agent, or Firm*—Armstrong, Westerman & Hattori, LLP

(57) ABSTRACT

An additive for synthetic resins is provided which comprises composite particles obtained by depositing a calcium phosphate compound (R) on support particles (M) of a petaloid porous structure. The additive of the present invention provides synthetic resin compositions having excellent transparency, anti-scratch property, anti-blocking property and less discoloration caused by deterioration of resin.

8 Claims, 2 Drawing Sheets

ADDITIVE COMPRISING POROUS CALCIUM PHOSPHATE FOR SYNTHETIC RESINS, AND SYNTHETIC RESIN COMPOSITION

TECHNICAL FIELD

The present invention relates to an additive for synthetic resins and a synthetic resin composition containing the additive. More specifically, it relates to an additive for synthetic resins having a low heating loss and a good dispersibility, and a synthetic resin composition containing the additive, which are less deteriorated and have an excellent appearance exhibiting less discoloration, for example, a synthetic resin film having a superior blocking prevention performance and a superior transparency, and a synthetic resin fiber having a superior dyeability.

BACKGROUND ART

Synthetic resins are widely used in various industrial fields. Among the synthetic resins, an industrially manufactured polyester, especially polyethyleneterephtalate (hereinafter referred to as PET) has superior physical and chemical features and is used as fibers, films, and other molded articles. For example, in a film area, the polyester is used for magnetic tapes such as audiotapes and videotapes, condensers, photographs, wrappings, OHP, pre-paid cards and so on.

Slipperiness and anti-shavingness of the polyester film are main features that control workability in a manufacturing step or a processing step of the film in various uses, and a quality of a product. In a case where a magnet layer is coated on a surface of the polyester film so as to use as a magnetic tape, if the slipperiness and anti-shavingness of the film are not sufficient, a friction between coating rolls and the surface of the film becomes large, thereby causing a severe abrasion of the surface of the film, and in an extreme case, resulting in wrinkles and scratches on the surface of the film. Even after processing the film into a tape such as audiotapes, videotapes and computer-tapes by slitting the film which is coated with the magnetic layer, an extreme friction between the surface of the film and many guides or a reproduction head will occur during operations such as drawing out of the tape from a reel or cassette, winding the tape and so on. This extreme friction causes scratches or strain, and the shaving of the surface of the polyester film deposits white powder, and results in a lack of magnetic recording signal, namely, drop-out.

For lowering a friction coefficient of the polyester, many methods for improving slipperiness of the surface of the molded articles are proposed by incorporating inorganic fine particles into polyester so as to give minute and appropriate roughness to the surface of the molded articles of the polyester. However, since affinity between the fine particles and the polyester is not sufficient, both transparency and anti-abrasion property of the film are not satisfactory.

In case of a polyolefin, for example, the polyolefin is widely used in various industrial fields. Especially, a polyolefin film such as a polypropylene film is the most widely used as various wrapping materials. Since it is known that such kind of the polyolefin film is adhesive, the polyolefin film tends to cause blocking. For this reason, workability in a process for manufacturing or processing of the film becomes worse. Furthermore, in a case where the film is used in packaging or wrapping, troubles such as less workability in opening the package or wrapping tend to occur.

Therefore, in general, an anti-blocking treatment is done on this kind of film. As an anti-blocking agent, a finely powdered silicic acid, zeolite, calcium-carbonate and kaolin clay are typically known and used.

On the other hand, the polyolefin film requires, as qualitative features, superior transparency and good anti-scratch property (For example, the surface of the film is less scratched when the surface of the film is contacted with each other.). However, the transparency and the anti-scratch property, are contrary to the anti-blocking property. For example, in order to improve the anti-blocking property of the polyolefin film, if a large amount of the blocking agent is used, the anti-scratch property and the transparency become poorer as an amount of the blocking agent to be added is increased. Therefore, as the additive to improve the anti-blocking property, the anti-scratch property and the transparency of the film to a satisfactory level, the conventional inorganic powder was far from satisfaction.

In case of the conventional kaolin clay, since the particle shape of the kaolin clay has a plate-like structure, when the kaolin clay is used as a blocking agent of the polyolefin film, the kaolin clay can not form roughness on the surface of the polyolefin film in a satisfactory level. Therefore, a large amount of kaolin clay is required to obtain a satisfactory level of anti-blocking property. As a result, only polyolefin film having insufficient transparency could have been obtained.

In case of the finely powdered silicic acid, since the main particles of the silicic acid is extremely minute, a polyolefin film with a satisfactory level of transparency and anti-scratch property can be obtained. However, since the silicic acid cannot form roughness on the surface of the polyolefin film, a polyolefin film having a satisfactory level of anti-blocking property could not have been obtained even though a large amount of silicic acid is used.

In case of the powdered zeolite, a polyolefin film that has good transparency and anti-blocking property can be obtained when compared to a film containing the kaolin clay or the finely powdered silicic acid. However, a film with good anti-scratch property can not be obtained. Moreover, since the zeolite is known to have crystalline water, the zeolite may cause defective products due to bubbling formed by the crystalline water which is released from the zeolite by heating in a process of molding a synthetic resin or making a film. If the zeolite is heated to remove the crystalline water (so called zeolite water) so as to make an activated zeolite which does not have crystalline water, the zeolite readsorbs water easily. Therefore, it is substantially impossible to remove an influence of the water in a process for film formation.

Furthermore, in case of the calcium carbonate, since the calcium carbonate does not have crystalline water, there is no bubbling due to the release of the crystalline water. However, since the calcium carbonate inherently has a strong aggregation tendency, the calcium carbonate tends to form secondary large particles which are formed by aggregation of many primary particles. Therefore, the calcium carbonate has problems to be solved as a good blocking agent for a polyolefin film with a good anti-blocking property, transparency and anti-scratch property.

In addition, in case of synthetic resin fibers, studies for forming roughness to improve dyeability of a polyester fiber which is difficult to dye, but there was a problem that the strength of the fiber per se lowers if the dyeability is taken seriously, to thereby damage superior properties inherent in the polyester fiber.

DISCLOSURE OF THE INVENTION

In view of the above facts, on an additive for synthetic resins which can give a good anti-blocking property, good transparency and good anti-scratch property to synthetic resins represented by polyesters or polyolefins, especially a film or a fiber thereof and which has a good affinity to the synthetic resin, and further on a synthetic resin composition containing the additive, the present inventors have found out that particles having a specific particle composition, specific particle diameter and distribution thereof and specific surface area have functions as the intended additive for synthetic resins, and that a synthetic resin composition containing this additive can attain the intended purpose, and disclosed in WO 97/03119 and WO 98/29490.

However, the particles disclosed by WO 97/03119 and WO 98/29490 cause, because of their heating loss, problems such as discoloration of a synthetic resin composition in which not only anti-blocking property, anti-scratch property and transparency, but beautiful appearance is demanded, and thus their use is sometimes limited.

The present inventors have made an extensive series of studies and found out that by depositing a calcium phosphate compound on the particles disclosed by WO 97/03119 and WO 98/29490, heating loss is reduced so that synthetic resin compositions which are less deteriorated and are not discolored to give shaped articles having a good appearance can be provided, and that because of high dispersibility, not only a synthetic resin composition for films having excellent anti-blocking property and transparency without discoloration, but a synthetic resin composition for fibers having excellent spinnability and dyeability can be provided, and have therefore completed the present invention.

That is, the present invention is, in a first aspect, to provide an additive for synthetic resins which comprises composite particles (MR) which are obtained by depositing a calcium phosphate compound (R) on support particles (M) having a petaloid porous structure, the composite particles satisfying the following formulas (a)–(h):

(a) $0.1 \leq Dmr \leq 20$ ($\mu$m)

(b) $1 \leq Dmr/Dm \leq 5$ (c) $0.5 \leq Tmr1 \leq 5$ (% by weight)

(d) $0.01 \leq Tmr1/Tm1 < 1$ (e) $0.3 \leq Tmr2 \leq 3$ (% by weight)

(f) $0.01 \leq Tmr2/Tm2 < 1$ (g) $1 \leq \alpha mr \leq 5$, where $\alpha + dmr50/Dmr$ (h) $0 \leq \beta mr \leq 2$, where $\beta = (dmr90 - dmr10)/dmr50$ wherein, Dmr: Average particle diameter ($\mu$m) of the composite particles (MR) measured by a photograph of a scanning electron microscope (SEM);

Dm: Average particle diameter ($\mu$m) of the support particles (M) measured by a photograph of a scanning electron microscope (SEM);

Tmr1: Heating loss (% by weight) at 500° C. of the composite particles (MR);

Tm1: Heating loss (% by weight) at 500° C. of the support particles (M);

Tmr2: Heating loss (% by weight) at 200° C. of the composite particles (MR);

Tm2: Heating loss (% by weight) at 200° C. of the support particles (M);

$\alpha mr$: Dispersion coefficient of the composite particles (MR);

dm50: 50% average particle diameter ($\mu$m) of the support particles (M) measured by a particle size distribution tester using a microtrack FRA laser;

dmr50: 50% average particle diameter ($\mu$m) of the composite particles (MR) measured by a particle size distribution tester using a microtrack FRA laser;

$\beta mr$: Sharpness of the composite particles;

dm90: 90% particle diameter of the total support particles (M) passed through a sieve measured by a particle size distribution tester using a microtrack FRA laser;

dmr90: 90% particle diameter of the total composite particles (MR) passed through a sieve measured by a particle size distribution tester using a microtrack FRA laser;

dm10: 10% particle diameter of the total support particles (M) passed through a sieve measured by a particle size distribution tester using a microtrack FRA laser;

dmr10: 10% particle diameter of the total composite particles (MR) passed through a sieve measured by a particle size distribution tester using a microtrack FRA laser;

The present invention is, in a second aspect, to provide a synthetic resin composition containing the foregoing additive for synthetic resins.

BEST MODE FOR CARRYING OUT THE INVENTION

Figure 1:
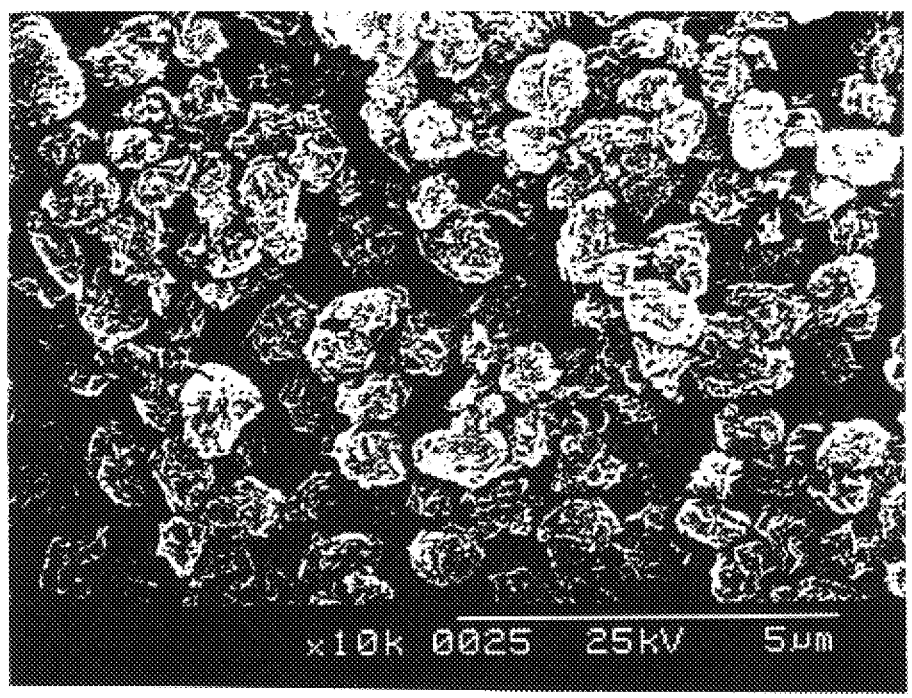
FIG. 1 is a photograph of an SEN of support particles M1 obtained by Reference Example 1.

One of the most important features of the present invention is to provide an additive for synthetic resins which comprises composite particles obtained by depositing a calcium phosphate compound (R) on support particles (M) having a petaloid porous structure, the composite particles having a specific form and a specific heating loss.

In the present invention, the word "depositing" means that the support particles (M) adsorb minute particles of the calcium phosphate compound (R), or that the calcium phosphate compound (R) precipitate to form a crystalline layer on the support particles (M).

The support particles (M) having a petaloid porous structure forming an additive for synthetic resins of the present invention are those particles disclosed by, for example, WO 97/03119 or WO 98/29490, which have a specific form, dispersibility and the like. Those particles, when used in a synthetic resin film, impart excellent anti-scratch property, anti-blocking property and transparency. The additive for synthetic resins of the present invention comprises composite particles depositing a calcium phosphate compound on their surface whereby heating loss is not only reduced to a low level, but problems such as deterioration and discoloration of synthetic resins are solved, with maintaining excellent features inherent in synthetic resin compositions.

The particles disclosed by WO 97/03119 and WO 98/29490 have the features as set forth below:
(Particles Disclosed by WO 97/03119)
The surface of particles is covered with petaloid porous hydroxyapatite having a chemical formula $Ca_3(PO_4)_3(OH)$, the petaloid porous hydroxyapatite being contained in the particles in a ratio of not less than 5% by weight, and the particles satisfying the following formulas (a)–(d):

(a) $0.1 \leq Dm \leq 20$ ($\mu$m)
(b) $1 \leq \alpha m \leq 5$, where $\alpha = d50/dm1$
(c) $0 \leq \beta m \leq 2$, where $\beta = (d90-d1)/d50$, and
(d) $40/Dm \leq Sm \leq 400$ wherein,
Dm1: Average particle diameter ($\mu$m) measured by a photograph of an electron microscope;
$\alpha$m: Dispersion coefficient;
d50: 50% average particle diameter ($\mu$m) measured by a particle size distribution tester using a microtrack FRA laser;
$\beta$m: Sharpness; a particle size distribution value; the smaller the value becomes, the sharper the distribution becomes;
d90: 90% particle diameter of the total particles passed through a sieve measured by a particle size distribution tester using a microtrack FRA laser;
d10: 10% particle diameter of the total particles passed through a sieve measured by a particle size distribution tester using a microtrack FRA laser;
Sm: BET specific surface area (m$^2$/g) by a nitrogen adsorbing method.

(Particles Disclosed by WO 98/29490)
The particles comprises petaloid porous hydroxyapatite having a formula $Ca_{10}((PO_4)_6(OH)_2$, and the particles satisfying the following formulas (a)–(d):

(a) $0.1 \leq Dm \leq 20$ ($\mu$m)
(b) $1 \leq \alpha m \leq 2$, where $\alpha = d50/dm^2$
(c) $0 \leq \beta m \leq 1.7$, where $\beta = (d90-d10)/d50$, and
(d) $50 \leq Sm \leq 400$ wherein,
Dm: Average particle diameter ($\mu$m) measured by a photograph of an electron microscope;
$\alpha$m: Dispersion coefficient;
d50: 50% average particle diameter ($\mu$m) measured by a particle size distribution tester using a microtrack FRA laser;
$\beta$m: Sharpness
d90: 90% particle diameter of the total particles passed through a sieve measured by a particle size distribution tester using a microtrack FRA laser,
d10: 10% particle diameter of the total particles passed through a sieve measured by a particle size distribution tester using a microtrack FRA laser;
Sm: BET specific surface area (m$^2$/g) by a nitrogen adsorbing method.

The particles disclosed by WO 97/03119 and WO 98/29490 are prepared by the following reaction conditions. For example, an aqueous-suspension of calcium carbonate as a support and a dilute aqueous solution of phosphoric acid are mixed in water so that an atomic ratio of Ca/P becomes not more than 33.3 under the following mixing conditions. The mixture is then aged under the following conditions to obtain an aqueous slurry of a calcium phosphate compound, followed by dehydration or without dehydration, drying under drying conditions at not higher than 700° C., and crushing.

(Mixing Conditions)
Solid concentration of the aqueous suspension of calcium carbonate: 1–15% by weight;
Phosphoric acid concentration of the dilute aqueous solution: 1–50% by weight;
Circumferential speed of a stirring blade: 0.5–50 m/sec
Mixing time: 0.1–150 hours;
Temperature of the aqueous suspension liquid: 0–80° C.;
and pH of a mixture of the aqueous suspension liquid: 5–9.

(Aging Conditions)
Calcium concentration: 0.4–5% by weight;
Aging time: 0.1–100 hours;
Temperature of the aqueous suspension liquid: 20–80° C.
pH of the aqueous suspension liquid: 6–9; and
Circumferential speed of a stirring blade: 0.5–50 m/sec.

As a general method for preparing the composite particles (MR) in the present invention, for example, particles selected from particles disclosed by WO 97/03119 or WO 98/29490 are used as support particles (M). An aqueous suspension of the support particles (M) and an aqueous suspension of an alkaline calcium compound are mixed where an aqueous solution of a water-soluble phosphate is mixed dropwise, or into an aqueous suspension of the support particles (M), an alkaline calcium compound and an aqueous solution of a water-soluble phosphate are added dropwise and mixed separately, to thereby obtain composite particles (MR) in which the calcium phosphate compound (R) synthesized is deposited on the support particles (M).

Herein, the measurement of a particle size distribution is explained. An aqueous slurry immediately after synthesis is subjected to ultrasonic wave (US-300, manufactured by Nippon Seiki Seisakusho) for one minute and the measurement-is conducted by the particle size distribution tester as above-mentioned. According to this method, almost the same results are obtained even when an aqueous suspension is changed to an ethylene glycol suspension, or even when the aqueous suspension is once dried and the obtained powder is suspended in water to obtain an aqueous suspension for the measurement.

The preferable preparation conditions of the composite particles (MR) are given below:
(Concentrations of Reaction Materials)
Solid concentration of an aqueous suspension of the support particles (M) (or concentration of the system in which an alkaline calcium compound is mixed):

1–50 parts by weight (based on 100 parts by weight of water) Concentration of an aqueous solution of the water-soluble phosphate:
1–4.00 parts by weight (based on 100 parts by weight of water) Concentration of an aqueous solution of the alkali calcium compound:
1–50 parts by weight (based on 100 parts by weight of water)

(Mixing)
Atomic ratio Ca/P: 1.5–10
1̂ Reaction temperature: 20–97° C.
2̂ Dropwise addition time: 1–600 minutes
3̂ Deposited amount of a calcium phosphate compound (R): 1–10000 parts by weight [based on 100 parts by weight of support particles (M)]
4̂ Circumferential speed of a stirring blade: 0.5–50 m/sec.
pH: 6–9

(Aging)
1 Temperature: 20–97° C.
2 pH: 8–10
3 Aging time: 0.1–100 hours
4 Circumferential speed of a stirring blade: 0.5–50 m/sec.

Concretely, a method in which a determined amount of a water-soluble alkaline calcium compound is preliminary added to an aqueous suspension of support particles (M) and a determined amount of a water-soluble phosphate is added dropwise thereto to synthesize a calcium phosphate compound (R), so that composite particles (MR) are prepared, and a method in which a water-soluble phosphate and an alkaline calcium compound are added separately within a determined time to an aqueous slurry of support particles (M) to thus synthesize a calcium phosphate compound (R), so that composite particles (MR) are prepared, and the like are exemplified. The former is good in workability and the latter is advantageous in that the preparation is possible while confirming the synthetic condition.

Each of the solid concentrations prepared is not specifically limited, but in the former case, the concentration of a system in which the support particles (M) and the alkaline calcium compound coexist is preferably not more than 50 parts by weight, more preferably 50–1 parts by weight based on 100 parts by weight of water, and the concentration of the water-soluble phosphate is preferably not more than 400 parts by weight, more preferably 400–1 parts by weight based on 100 parts by weight of water.

On the other hand, in the latter case, the concentration of the support particles (M) is preferably not more than 50 parts by weight, more preferably 50–1 parts by weight, based on 100 parts by weight of water, the concentration of the alkaline calcium compound is preferably not more than 50 parts by weight, more preferably 50–1 parts by weight, based on 100 parts by weight of water, and the concentration of the water-soluble phosphate is preferably not more than 400 parts by weight, more-preferably 400–1 parts by weight, based on 100 parts by weight of water. If those are in excess of the foregoing ranges, dispersibility of the composite particles (MR) prepared is liable to be interfered with.

The atomic ratio Ca/P of the calcium phosphate compound (R) varies depending upon the use of an additive for synthetic resins of the present invention and thus is not specifically limited, it is usually 1.5–10, preferably 1.6–5, more preferably 1.62–2. If it is less than 1.5, an unreacted phosphate increases and washing takes time, which tends to result in an increase in cost, while if it is more than 10, calcium carbonate and the composite particles are mixed separately so that uniformity and dispersibility of the particles tend to be deteriorated.

As the water-soluble phosphate, monoammonium phosphate, diammonium phosphate, triammonium phosphate, monosodium phosphate, disodium phosphate, trisodium phosphate, monopotassium phosphate, dipotassium phosphate and tripotassium phosphate are exemplified. These may be used singly or in combination of two or more.

As the alkaline calcium compound, calcium carbonate, calcium oxide and calcium hydroxide are exemplified. Among those, calcium carbonate, pH of which is in the range of 8–10 is easy to use since the production of a calcium phosphate compound (R) is fast or the production of a crystalline layer through the precipitation of the calcium phosphate compound (R) onto the support particles (M) is good. Further, colloidal calcium carbonate having an average particle size by SEM of 0.01–5 $\mu$m, preferably 0.03–1 $\mu$m, more preferably 0.05–0.5 $\mu$m is versatile and preferably used.

The calcium phosphate compound (R) forming the additive for synthetic resins of the present invention is not specifically limited if it is high in heat stability, but those having crystalline forms such as an acicular shape, a columnar shape and a plate shape are preferred. Moreover, those comprising hydroxyapatite as a main ingredient are preferred. As calcium phosphates other than hydroxyopatite increase, heat stability of particles lowers, which makes it difficult to obtain the intended additive for synthetic resins.

The Dmr of the composite particles (MR) in the present invention is $0.1 \leq Dmr \leq 20$ ($\mu$m), preferably, $0.2 \leq Dmr \leq 10$ ($\mu$m), and more preferably, $0.2 \leq Dmr \leq 5$ ($\mu$m).

If the Dmr is less than 0.1 $\mu$m, the dispersion of the additive in the synthetic resin is not easy, and furthermore, the sufficient anti-blocking property can not be revealed when the additive is used in, for example, a synthetic resin fiber or film. If the Dmr is more than 20 $\mu$m, not only the transparency of the synthetic resin is damaged, but also there causes coarse protrusions when used in, for example, a synthetic resin film.

The Dmr/Dm of the composite particle (MR) is $1 \leq Dmr/Dm \leq 5$, preferably $1 \leq Dmr/Dm \leq 2$. If it is less than 1, a calcium phosphate compound (R) and support particles (M) are not compounded since the former is not completely supported by the latter. As a result, since the calcium phosphate compound (R) forms particles newly and exists independently, dispersibility in a synthetic resin is not good, so that a sufficient anti-blocking property is not provided when used in, for example, a synthetic resin film or fiber. If the Dmr/Dm is more than 5, the calcium phosphate compound (R) supported by the support particles (M) functions as a binder to cause aggregation which not only damages transparency of a synthetic resin, but causes coarse protrusions when used in, for example, a synthetic resin film.

The Tmr1 and Tmr2 of the composite particles (MR) are $0.5 \leq Tmr1 \leq 5$ (% by weight) and $0.3 \leq Tmr2 \leq 3$ (% by weight), preferably $0.5 \leq Tmr1 \leq 4$ (% by weight) and $0.3 \leq Tmr2 \leq 2$ (% by weight), respectively.

If the Tmr1 and Tmr2 are less than 0.5% by weight and 0.3% by weight, respectively, excellent particle size and porous structure of the support particles (M) are not maintained in the composite particles (MR), and when used in, for example, a synthetic resin film, good anti-scratch property and transparency are not obtained. Moreover, when used in a synthetic fiber, anti-stick property is low and thus a good spinnability is not obtained. If the Tmr1 and Tmr2 are more than 5% by weight and 3% by weight, respectively, heating loss is large and thus a synthetic resin composition which is less in deterioration and discoloration is not obtained.

The proportion of Tmr1 of the composite particles (MR) and Tm1 of the support particles (M), and the proportion of Tmr2 of the composite particles (MR) and Tm2 of the support particles (M) are $0.01 \leq Tmr1/Tm1 < 1$ and $0.01 \leq Tmr2/Tm2 < 1$, respectively. If the Tmr1/Tm1 and Tmr2/Tm2 are less than 0.01, excellent particle size and porous structure of the support particles (M) are not maintained in the composite particles (MR), when used in, for example, a synthetic resin film, good anti-scratch property and transparency are not obtained. Moreover, when used in a synthetic fiber, anti-stick property is low and thus a good spinnability is not obtained. If the Tmr1/Tm1 and Tmr2/Tm2 are more than 1, heating loss of the support particles (M) is not improved even when compounded, a synthetic resin composition having less deterioration or discoloration is not obtained. If the Tmr1/Tm1 and Tmr2/Tm2 are 1, the support particles are not compounded but only grow, and if the Tmr1/Tm1 and Tmr2/Tm2 are more than 1, a calcium phosphate compound having a greater heating loss than the support particles (M) is considered to be produced upon the compounding.

The αmr and βmr of the composite particles (MR) are $1 \leq \alpha mr \leq 5$ and $0 \leq \beta mr \leq 2$, respectively, preferably, $1 \leq \alpha mr \leq 2$ and $0 \leq \beta mr \leq 1.7$, more preferably, $1 \leq \alpha mr \leq 1.5$ and $0 \leq \beta mr \leq 1$, respectively. If the αmr is more than 5, for example, in a field of film, since a size of concavo-convex of the surface of the film obtained by addition of such an additive becomes uneven, a film having a sufficient anti-blocking property can not be obtained. If the αmr is less than 1, particles aggregate to be uneven.

When the βmr is over 2, the particle size distribution becomes broad so that contents of unnecessary fine particles for synthetic resin compositions and coarse particles which cause coarse protrusions of the surface of a synthetic resin film become high. Therefore, the additive for synthetic resins that can give a sufficient anti-blocking property and good transparency to the synthetic resin compositions such as synthetic resin films can not be obtained.

The atomic ratio Ca/P in the composite particles (MR) is not specifically limited, but from the viewpoint of obtaining a synthetic resin film having a sufficient anti-scratch property, for example, it is preferably not more than 5.56, more preferably, not more than 3.33, most preferably, not more than 1.85.

If the Ca/P is more than 5.56, a synthetic resin film having a sufficient anti-scratch property is difficult to be obtained. The lower limit is preferably about 1.60 from the viewpoint of maintaining stability of the particles.

The Smr of the composite particles (MR) is not specifically limited, but preferably $3 \leq Smr \leq 300$ (m²/g), more preferably $10 \leq Smr \leq 100$ (m²/g), still more preferably $20 \leq Smr \leq 70$ (m²/g). If the Smr is less than 3 m²/g, a good anti-scratch property is not obtained in case of, for example, a synthetic resin film, and if the Smr is more than 300 m²/g, heating less becomes sometimes large so that the intended synthetic resin composition having less deterioration and discoloration is not obtained.

The proportion of Smr of the composite particles (MR) and Sm of the support particles (M) is not specifically limited, but preferably $0.01 \leq Smr/Sm < 1$. If the Smr/Sm is less than 0.01, good anti-scratch property is difficult to be obtained in case of, for example, a synthetic resin film.

The proportion of Smr and S1 of the composite particles (MR) is not specifically limited, but preferably $3 \leq Smr/S1 \leq 125$, more preferably $5 \leq Smr/S \leq 100$, most preferably $3 \leq Smr/S1 \leq 125$. If the Smr/S1 is less than 3, a good anti-scratch property is difficult to be obtained, and if it is more than 125, heating loss becomes sometimes large so that the intended synthetic resin composition having less deterioration and discoloration is not obtained.

The additive for synthetic resins comprising the foregoing composite particles (MR) of the present invention is blended with various synthetic resins to give resin compositions.

Synthetic resins with which the additive for synthetic resins of the present invention is blended are not specifically limited. As thermoplastic resins, polyethylene, polypropylene, polystyrene, polyvinyl acetate, polyacrylate, polyacrylamide, polyester, polyacrylonitrile, polyamide, polyvinyl chloride, polyvinylidene chloride and so on are exemplified. As thermosetting resins, phenol resin, epoxy resin, unsaturated polyester resin, alkyd resin, urea resin, melamine resin, urethane resin, silicone resin and so on are exemplified. Among them, the additive of the present invention is especially applicable to a film composition and a fiber composition made from polyolefin or saturated polyester.

The polyolefin is not limited as far as the polyolefin has ability to form a transparent and crystalline self-supporting film. As the polyolefin, crystalline homopolymers of α-olefins having carbon number 2–12 or crystalline copolymers of two or more kinds thereof, are exemplified. For example, polyethylene, polypropylene, poly-4-methylpentene-1, ethylene-propylene random or block copolymers, ethylene-propylene-butene copolymers and ethylene-propylene-hexene copolymers are exemplified. Among them, polypropylene or copolymers of propylene containing 50% by weight or more of propylene and the other α-olefins is preferable. Especially, a propylene polymer containing 0–6% by weight of ethylene is preferable.

Those polyolefins are crystalline and have isotactic index (II) of 40 or more, preferably, 60 or more, and most preferably, 90 or more. Further, they are usable as far as they can be molded. Usually, polyolefins have preferably a melt flow rate (MFR) of 0.01–100 g/10 min., more preferably 0.1–50 g/10 min., most preferably 0.5–10 g/10 min.

The amount of the additive for synthetic resins in the synthetic resin composition of the present invention is usually 0.001–20 parts by weight, preferably 0.001–10 parts by weight, more preferably 0.01–5 parts by weight based on 100 parts by weight of resin. If it is less than 0.001 part by weight, the adding effect of the additive is insufficient, and if it is more than 20 parts by weight, the dispersibility of the additive tends to lower. In case of, for example, a synthetic resin film, anti-scratch property and transparency tend to lower and in case of a synthetic fiber, spinnability tends to lower.

The additive for synthetic resins of the present invention can be used with one or more other additives for synthetic resins. Such additives include pigments, dyes, ultraviolet absorbers, many kinds of stabilizers, antioxidants, shading agents (for example, carbonblack, titanium oxide), processing aids, anti-static agents, anti-microbial agents, deodorants, agricultural medicines, perfumes, and so on, and these may be used singly or in combination of two or more. Since the additive for synthetic resins of the present invention has a high specific surface and a high percentage of voids, and has a superior absorbability and a retention activity, the above additives can be used by being adsorbed to or retained to the additive particles of the present invention.

For example, as the anti-microbial agent, inorganic anti-microbial agents such as silver, copper and zinc, quaternary ammonia such as benzalkonium chloride and cetylpyridinium chloride, alcohols such as ethanol and isopropanol, aldehydes such as formaldehyde and glyoxal, phenols such as cresol and xylenol, carboxylic acids such as sorbic acid and benzoic acid, guanidines such as chlorhexyzine and n-dodecylguanidine acetate, thiazoles such as 2-mercaptobenzothiazole, and 2-methyl-4-isothiazoline-3-one can be used.

As the deodorant, tannic acid, camphor oil, and turpentine oil can be used. As the agricultural medicine, dimethyl phtalate, 2-ethyl-1,3-hexanediol, indalone, dimethyl carbate, irgabirine, PCP agent (pentachlorophenol), MEP agent (dimethyl thiophosphate) and ECP agents (diethyldichlorophenyl thiophosphate) can be used. As the ultraviolet absorber, 2,4-dihydroxybenzophenone, phenylsalicylate, 2-(2'-hydroxy-5'-methyl-phenyl)-benzotriazole and 2-ethylhexyl-2-cyano-3,3-diphenylacrylate can be used.

As the dye, azo dye, anthraquinone dye, indigoid dye, sulfur dye and triphenylmethane dye can be used. As the perfume, natural perfumes such as musk, abies oil, bergamot oil, boroaze oil, rosewood oil, rosemary oil and orange-flower oil, synthetic perfumes such as ethyl acetoacetate, anethole, amylcinnamic aldehyde, ethyl isovalerate and isoamyl acetate and perfume mixtures including rose group, jasmine group, lilac group and so on can be used.

The amount of addition of these additives is not specifically limited. However, 0.0001–100% by weight based on 100 parts by weight of the additive for synthetic resins of the present invention is preferable.

If necessary, other anti-blocking agents, for example, inorganic particles such as synthetic spherical silica, β, γ-alumina, aulminosilicate, synthetic zeolite, titanium oxide, kaolin, clay, talc, barium sulfate and calcium carbonate, amorphous calcium phosphate having no petaloid structure [ACP: $Ca_3(PO_4)_2.nH_2O$], fluorine apatite [FAP: $Ca_{10}(PO_4)_6F_2$], chlorine apatite [CAP: $Ca_{10}(PO_4)_6Cl_2$], hydroxyapatite [HAP: $Ca_{10}(PO_4)_6(OH)_2$], octacalcium phosphate [OCP: $Ca_8H_2(PO_4)_6.5H_2O$], tricalcium phosphate [TCP: $Ca_3(PO_4)_2$], calcium hydrogenphosphate (DCP: $CaHPO_4$), calcium hydrogenphosphate.$2H_2O$(DCPD: $CaHPO_4.2H_2O$), etc. may be used singly or in combination of two or more depending on the object. Moreover, organic high molecular weight particles including silicone resin particles, cross-linked acrylic resins, polymethylmethacrylate particles, cross-linked polystyrene particles, cross-linked polyethylene particles, polyfluorocarbon (Teflon) particles and polyimide particles can be used conjointly with the additive of the present invention. The amount of these particles to be added is not specifically limited, however, usually, 0.01–3 parts by weight based on 100 parts by weight of the additive for synthetic resins of the present invention is preferable.

In order to increase the ability of dispersion and stabilization, the surface of the additive particle of the present invention can be treated, according to a conventional method, with coupling agents such as silane coupling agents and titanate coupling agents, surface treating agents including organic acids such as fatty acids, resin acids, acrylic acid, oxalic acid, citric acid and tartaric acid, inorganic acids such as hydrofluoric acid, polymers thereof, salts thereof or esters thereof and so on, surfactants, and condensed phosphoric acids and salts thereof such as sodium hexametaphosphate, pyrophosphoric acid, sodium pyrophosphate, tripolyphosphoric acid, sodium tripolyphosphate, trimetaphosphoric acid and highpolyphosphoric acid.

In particular, the additive surface-treated with fatty acids (salts) and fatty acid esters exhibits excellent dispersibility. As the fatty acid, those having carbon atoms of not less than 8 such as lauric acid (C=12), mylistic acid (C=14), palmitic acid (C=16) and stearic acid (C=18) may be exemplified. As the salts of those fatty acids, those of alkali metals such as Na, K and Li, and Al, Mn, Fe, Co, Ni, Cu, Zn and the like may be exemplified.

As the fatty acid ester, for example, stearic acid stearate, stearic acid laurate, stearic acid palmitate and palmitic acid laurate may be exemplified. Not only esters obtained from monovalent alcohols, but esters obtained from multivalent alcohols are included. These may be used singly or in combination of two or more. Esters having a high unsaturation degree or low purity exhibit the similar effects as a surface-treating agent, but the color of the surface-treating agent per se gives-sometimes an adverse effect to whiteness of the additive, and thus in a use where coloring of a synthetic resin composition is not desired, it is necessary to control the amount surface-treated as low as possible.

Hereinafter, the present invention will be explained in greater detail by showing examples and comparative examples, which in no way limit the present invention.

REFERENCE EXAMPLES 1–4

Preparation of Support Particles (M) of Petaloid Porous Structure

An aqueous solution of calcium carbonate and a dilute aqueous solution of phosphoric acid were mixed under the mixing conditions shown in Table 1, then aged under the aging conditions shown in Table 1 to thereby obtain aqueous slurries of the particles M1–M4. The properties of the particles M1–M4 are shown in Table 2. It is known from Table 2 that the particles M1, M2 and M3 satisfy the conditions described by WO 97/03119 and WO 98/29490 and are preferable as support particles (M) of a petaloid porous structure forming the additive for synthetic resins of the present invention. The particles M4 do not satisfy the conditions described by the above publications and are not suitable as the support particles (M) of a petaloid porous structure forming the additive for synthetic resins.

TABLE 1

| Reference Examples | 1 | 2 | 3 | 4 |
|---|---|---|---|---|
| Support particles | M1 | M2 | M3 | M4 |
| Average particle diameter of calcium carbonate (μm) | 0.1 | 0.1 | 0.1 | 0.1 |
| Solid concentration of aqueous suspension of calcium carbonate after preparation (Parts by weight*) | 10 | 10 | 10 | 10 |
| Concentration of dilute phosphoric acid (Parts by weight*) | 10 | 10 | 10 | 10 |
| (Mixing condition) | | | | |
| C a/p | 1.95 | 2.87 | 1.67 | 1.67 |
| Dropwise addition time (min) | 300 | 150 | 60 | 90 |
| Reaction temperature (° C.) | 50 | 40 | 50 | 50 |
| pH of aqueous suspension | 6–7 | 6–7 | 6–7 | 6–7 |
| Circumferential speed of stirring blade (m/sec) | 5.0 | 5.0 | 5.0 | 0.1 |
| (Aging conditions) | | | | |
| Time (min) | 1000 | 1000 | 1000 | 1000 |
| Temperature (° C.) | | | | |
| Time (min) | 1000 | 1000 | 1000 | 1000 |
| pH of aqueous suspension | 6–9 | 6–9 | 6–9 | 6–9 |

*Parts by weight per 100 parts by weight of water

TABLE 2

| Reference Examples | 1 | 2 | 3 | 4 |
|---|---|---|---|---|
| Support particles | M1 | M2 | M3 | M4 |
| Dm | 0.8 | 1.5 | 4.5 | 25 |
| αm | 1.2 | 1.7 | 1.4 | 1.2 |
| βm | 0.6 | 0.8 | 0.8 | 1.0 |
| Sm | 165 | 150 | 140 | 120 |
| Tm1 | 7.3 | 8.1 | 9.6 | 12.9 |
| Tm2 | 3.4 | 3.8 | 4.7 | 9.5 |

EXAMPLES 1–3

After the completion of aging, with stirring of each of the aqueous slurries containing the support particle M1–M3 obtained by Reference Examples 1–3, an aqueous solution of calcium carbonate and a water-soluble phosphate were added dropwise separately and mixed, then aged with stirring to thereby deposit a calcium phosphate compound (R) on the support particles M1–M3, in accordance with the preparation method shown in Table 3. After dehydration, washing, drying and crushing, the composite particles (MR) E1–E3 were thus obtained. The properties of these composite particles are shown in Table 4.

It is confirmed from Table 4 that the composite particles (MR) E1–E3 which are additives for synthetic resins of Examples 1–3 are able to control a specific surface area with uniformity and dispersibility maintained and to suppress heating loss. This is presumably considered because the reaction took place only between the water-soluble phosphate and the calcium carbonate and did not take place with the support particles (M). As apparent from Example 1, it is possible to obtain the composite particles (E1) with an average particle diameter of the support particles (M1) by selecting the most suitable amount deposited. It is confirmed that the crystal form of both particles M1–M3 and E1–E3 was measured by XRD and exhibited a peak of hydroxyapatite as a main ingredient, and that the degree of crystallinity was enhanced with the composite particles (MR) E1—E1 than the support particles M1–M3 and as the amount deposited increased from E1 to E3.

Figure 2:
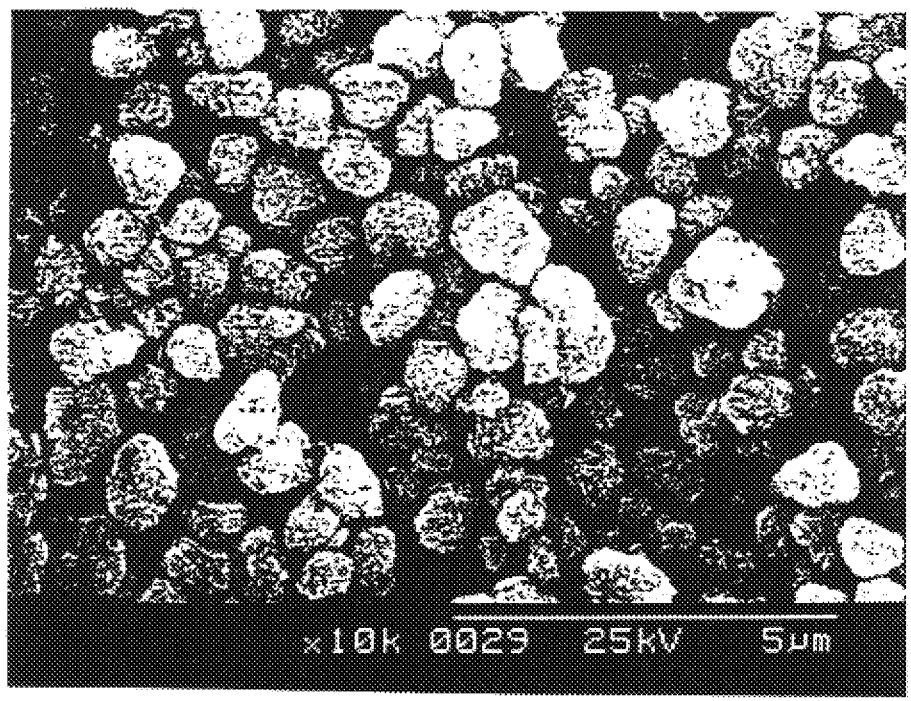
FIG. 2 is a photograph of an SEM of composite particles E1 as an additive for synthetic resins obtained by Example 1.

FIG. 1 is an SEM photograph (×10000 magnification) of the support particles (M1) and FIG. 2 is an SEM photograph (×10000 magnification) of the composite particles E1.

COMPARATIVE EXAMPLES 1–3

In the same manner as in Examples 1–3, an aqueous solution of calcium carbonate and a water-soluble phosphate were added dropwise separately and mixed with stirring and aged under the aging conditions to thereby deposit a calcium phosphate compound (R) on the support particles M1 in accordance with the preparation method shown in Table 3. After dehydration, washing, drying and crushing, the composite particles (MR) F1, F2 and F3 of Comp. Examples 1, 2 and 3 were obtained. The properties of these composite particles are shown in Table 4.

TABLE 3

| | Examples | | | Comp. Examples | | |
|---|---|---|---|---|---|---|
| | 1 | 2 | 3 | 1 | 2 | 3 |
| Support particles | M1 | M2 | M3 | M1 | M1 | M1 |
| Aqueous solution of support particles (M) (kg) | 100 | 100 | 100 | 100 | 100 | 100 |
| Solid concentration (Parts by weight*) | 5 | 5 | 5 | 5 | 5 | 5 |
| Average particle diameter of calcium carbonate ($\mu$m) | 0.1 | 0.1 | 0.1 | 0.1 | 0.1 | 0.1 |
| Solid concentration of aqueous suspension (Parts by weight*) | 10 | 10 | 10 | 10 | 10 | 10 |
| Dilute aqueous solution of phosphate | Monosodium phosphate | Monosodium phosphate | Diammonium phosphate | Phosphoric acid | Phosphoric acid | Monosodium phosphate |
| Solid concentration (Parts by weight*) (Mixing condition) | 20 | 20 | 20 | 20 | 20 | 20 |
| Atomic ratio Ca/P | 1.67 | 1.67 | 1.67 | 1.67 | 1.67 | 1.67 |
| Reaction temperature (° C.) | 70 | 70 | 60 | 70 | 70 | 60 |
| Amount deposited of calcium phosphate compound (R) (Parts by weight*) | 300 | 500 | 700 | 300 | 500 | 200 |
| Dropwise addition time (min: per 100 parts by weight) | 60 | 90 | 120 | 60 | 60 | 60 |
| Circumferential speed of stirring blade (m/sec) | 5.0 | 5.0 | 5.0 | 5.0 | 5.0 | 5.0 |
| pH of aqueous suspension (Aging conditions) | 6–9 | 6–9 | 6–9 | 6–9 | 6–9 | 6–9 |
| Time (min) | 1000 | 1000 | 1000 | 1000 | 1000 | 1000 |
| Temperature of aqueous suspension (° C.) | 70 | 70 | 60 | 70 | 70 | 70 |
| pH of aqueous suspension | 6–9 | 6–9 | 6–9 | 6–9 | 6–9 | 6–9 |
| Circumferential speed of stirring blade (m/sec) | 5.0 | 5.0 | 5.0 | 5.0 | 3.0 | 5.0 |

*Parts by weight per 100 parts by weight of water
**Parts by weight per 100 parts by weight of support particles (M)

TABLE 4

| | Examples | | | Comp. Examples | | |
|---|---|---|---|---|---|---|
| | 1 | 2 | 3 | 1 | 2 | 3 |
| Composite particles (MR) | E1 | E2 | E3 | F1 | F2 | F3 |
| Support particles | M1 | M2 | M3 | M1 | M1 | M1 |
| R/M | 300 | 500 | 700 | 300 | 300 | 200 |
| Dmr | 0.8 | 2.5 | 6.5 | 2.5 | 5.5 | 0.8 |
| Dmr/Dm | 1.0 | 1.6 | 1.4 | 3.1 | 6.8 | 1.0 |
| Tmr1 | 3.9 | 3.5 | 2.9 | 7.8 | 5.8 | 7.3 |
| Tmr1/Tm1 | 0.53 | 0.43 | 0.30 | 1.07 | 0.79 | 1.0 |
| Tmr2 | 0.8 | 0.7 | 0.6 | 3.8 | 3.4 | 3.0 |
| Tmr2/Tm2 | 0.25 | 0.20 | 0.14 | 1.11 | 1.0 | 0.88 |
| αmr | 1.1 | 1.5 | 1.2 | 1.5 | 2.3 | 1.1 |
| βmr | 0.6 | 0.6 | 0.7 | 0.6 | 4.7 | 0.6 |
| Smr | 75 | 49 | 34 | 83 | 52 | 98 |
| Smr/Sm | 0.45 | 0.32 | 0.24 | 0.50 | 0.31 | 0.59 |
| Smr/S1 | 31 | 63 | 114 | 107 | 148 | 41 |

EXAMPLES 4–6 AND COMPARATIVE EXAMPLES 4–9

In Examples 4, 5 and 6, the particles E1, E2 and E3 prepared in Examples 1, 2 and 3 and in Comp. Examples 4, 5 and 6, the particles F1, F2 and F3 prepared in Comp. Examples 1, 2 and 3, in Comp. Example 7, the particles M1 prepared in Ref. Example 1, in Comp. Example 8, the particles M4 prepared in Ref. Example 4, were used to prepare polypropylene compositions. In Comp. Example 9, no particles were used as a control. From the compositions, biaxially oriented polypropylene films were obtained according to the method shown below, and the quality of the films was evaluated. The results are shown in Table 5. It is confirmed from table 5 that the resin compositions of the present invention have excellent film properties and exhibit less discoloration due to resin deterioration.

(Preparation of Polyolefin Films)

To 100 parts by weight of a polypropylene resin having a melt flow rate of 1.9 g/10 min., 0.10 part by weight of 2,6-di-t-butyl-p-cresol and 0.02 part by weight of Irganox 1010 (registered trade mark of Chiba Geigy) as an antioxidant, 0.05 part by weight of calcium stearate as a hydrochloric acid catcher and each of the foregoing particles was added, mixed with Super mixer, and pelletized by an extruder.

The obtained pellets were formed into a sheet film by the use of an extruder and the obtained film was drawn 5 times to the longitudinal direction and 10 times to the lateral direction, and consequently, a stretched film of 30 μm thickness was obtained.

On one side of the biaxially stretched film thus obtained, corona discharge treatment was carried out.

The biaxially oriented film thus obtained was measured with respect to transparency, anti-blocking property and anti-scratch property.

The transparency of the film was measured by using 4 sheets of films piled up according to ASTM-D-1003.

The anti-blocking property of the film was measured as follows: two sheets of films were piled one upon another so that the contacting area is 10 cm$^2$, the layered films were put between two glass plates, a 50 g/cm$^2$ load was added to the films and left for 7 days at 40° C., the layered films were pulled apart at a rate of 500 mm/min. by using Schopper tensile tester and the maximum load value was obtained.

The anti-scratch test-was done as follows: one biaxially oriented film was fixed on a glass plate, another biaxially oriented film was fixed on a box-type container having the contacting area of 50 cm$^2$, these two films were scratched 6 times with a load of 4 kg, and a value of transparency was measured before and after scratching. The smaller the value becomes, the better the anti-scratch property becomes.

The b value is a measured value by Hunter Color difference meter. The smaller the value becomes, the smaller the discoloration due to resin deterioration becomes.

TABLE 5

| | Particles | | Properties of polyolefin films | | | |
|---|---|---|---|---|---|---|
| Examples & Comp. Examples | Kinds | Amounts added (Parts by weight) | Transparency % | Anti-blocking property g/10 cm$^2$ | Anti-scratch property | b values |
| Example 4 | E1 | 0.08 | 9.5 | 22 | 4.5 | 3.0 |
| Example 5 | E2 | 0.08 | 9.2 | 34 | 4.6 | 2.8 |
| Example 6 | E3 | 0.08 | 8.6 | 34 | 4.6 | 2.6 |
| Comp. Ex. 4 | F1 | 0.08 | 9.1 | 34 | 4.6 | 7.0 |
| Comp. Ex. 5 | F2 | 0.08 | 8.5 | 45 | 6.7 | 6.0 |
| Comp. Ex. 6 | F3 | 0.08 | 8.6 | 24 | 4.6 | 5.5 |
| Comp. Ex. 7 | M1 | 0.08 | 9.5 | 22 | 4.5 | 9.5 |

TABLE 5-continued

| | Particles | | Properties of polyolefin films | | | |
|---|---|---|---|---|---|---|
| Examples & Comp. Examples | Kinds | Amounts added (Parts by weight) | Transparency % | Anti-blocking property g/10 cm$^2$ | Anti-scratch property | b values |
| Comp. Ex. 8 | M4 | 0.08 | 6.7 | 300 | 7.0 | 8.0 |
| Comp. Ex. 9 | Blank | — | 2.0 | 2400 | 1.0 | 2.5 |

EXAMPLES 7–9 AND COMPARATIVE EXAMPLES 10–14

In Examples 7, 8 and 9, the particles E1, E2 and E3 prepared in Examples 1, 2 and 3, in Comp. Examples 10, 11 and 12, the particles F1–F2 and F3 prepared in Comp. Examples 1, 2 and 3, in Comp. Example 13, the particle M1 prepared in Ref. Example 1 and in Comp. Example 14, the particle-M4 prepared in Ref. Example 4 were used to obtain ethylene glycol slurries. The obtained ethylene glycol slurries were added prior to a polyesterification, followed by a polyesterification reaction, to thus obtain polyethyleneterephthalates containing 0.1 part by weight of the particles based on 100 parts by weight of resin and having a limiting viscosity number (orthochlorophenol, 35° C.) of 0.62 dl/g. The polyethyleneterephthalates were dried at 160° C., followed by a melt extrusion at 290° C., rapidly cooled and solidified on a casting drum having a temperature maintained at 40° C., thereby obtaining unstretched films. The thus obtained unstretched films were pre-heated at 70° C. by a heating roller, stretched 3.6 times to the longitudinal direction while heating with an infrared heater, and then stretched 4 times to the lateral direction at 90° C., followed by heat treatment at 200° C. Thus, biaxially oriented films having a thickness of 15 μm were obtained.

The quality of the thus obtained films was evaluated according to the following methods. The results are shown in Tables 6.

It is confirmed from Table 6 that the synthetic resin compositions of the present invention containing the particles E1, E2 and E3 have excellent film properties and exhibit less discoloration due to resin deterioration.

1̂ Surface Roughness of the Film (Ra)

The surface roughness of the film is a value defined as a center line average height (Ra) of JIS-B0601. In the present invention, a tracer type surface roughness tester of Kosaka kenkyusho Co., Ltd., (SURFCORDER SF-30C) was used to measure the center line average height. Measuring conditions are as follows:

(a) radius of a head of the tracer: 2 μm, (b) measuring pressure: 30 mg, (c) cut off: 0.25 mm, (d) length for measurement: 0.5 mm, and (e) an average value is calculated from 4 data obtained by excluding the highest value from 5 repeated values on the same sample.

2̂ Friction Coefficient of the Film ($\mu k$)

Figure 3:
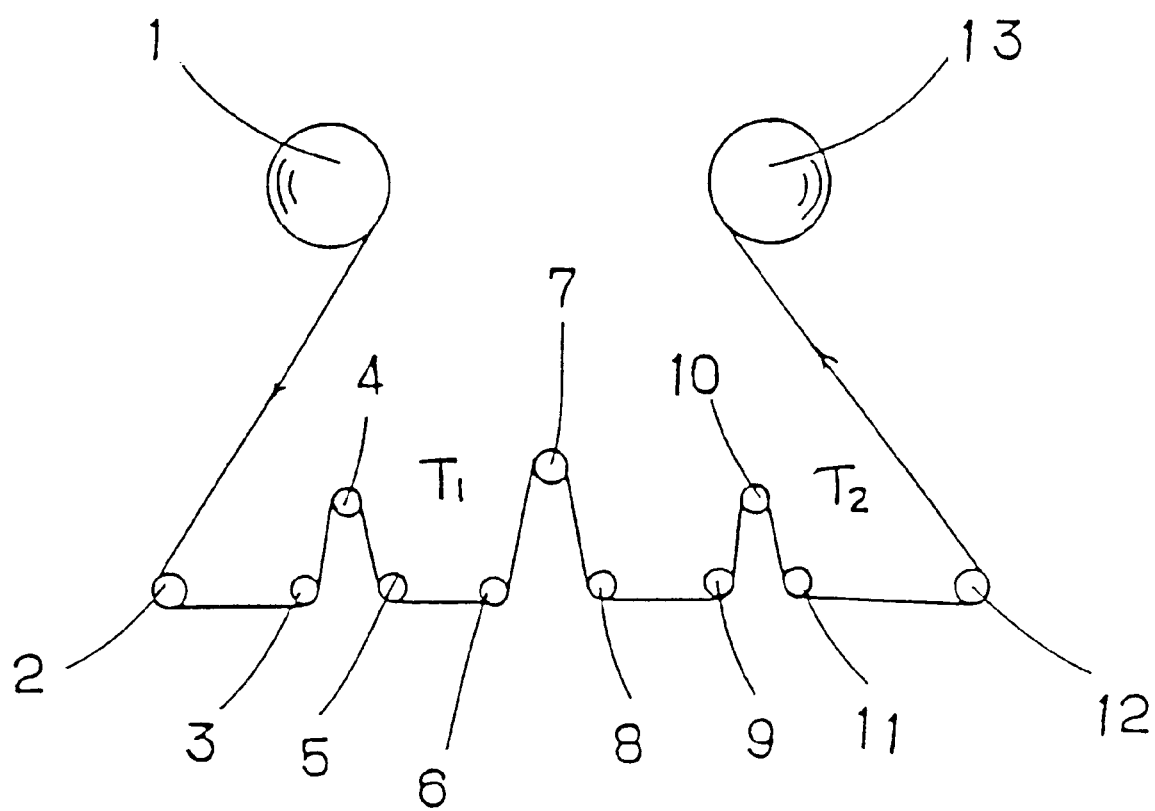
FIG. 3 is a schematic representation of an apparatus for measuring a friction coefficient of a film.

The friction coefficient is measured by using an apparatus shown in FIG. 3. In FIG. 3, each number shows parts of the apparatus, respectively, as follows: 1: unwinding reel; 2:

tension controller; 3,5,6,8,9 and 11: free roller; 4: tension detector (inlet); 7: fixing bar (outer diameter: 5 mm) made of stainless steel net, SUS304; 10: tension detector (outlet); 12: guide roller; and 13: winding reel.

Under conditions of a temperature of 20° C. and a humidity of 60%, a cut film of ½ inch width was contacted with the fixing bar 7 (surface roughness: 0.3 μm) at an angle of θ=(152/180)π radian (152°) and moved (frictioned) at a rate of 200 cm per min. When the tension controller is adjusted so that the inlet tension T1 is 35 g, the outlet tension (T2:g) is detected by the outlet tension detector after 90 meter run of the film. The traveling friction coefficient μk is calculated from the following equation:

$$\mu k=(2.303/\theta) \log (T2/T1)=0.86 \log (T2/35)$$

③ Evaluation of Abrasion-I

A surface of the film of ½ inch width is contacted with a stainless steel fixing pin (surface roughness 0.58 μm) having a diameter 5 mm at an angle of 150°, and the fixing pin is moved and frictioned reciprocally about 15 cm intervals at a rate of 2 meters per minute. In this case, the inlet tension T1 is 60 g.

The above operations are repeated, and after 40 reciprocal movements, degree of scratches raised on the surface of the film is visually examined. The four-rank evaluation of the scratches is made according to the criteria: A: scratches are scarcely found; B: a few scratches are found; C: scratches are considerably found; and D: scratches are found all over the surface.

④ Evaluation of Abrasion-II

Shavingness of the running surface of the film is evaluated by using a 5 layered minisuper calender. The calendar is 5 layered of nylon rolls and steel rolls. A treatment temperature is 80° C. and a linear load on the film is 200 kg/cm. A film speed is 50 meters/min. After running film 4000 meters in total, the shavingness of the film is evaluated by smudge adhered to the top roll of the calender.
<Four-rank Evaluation>

A: no smudge on the roll

B: little smudge on the roll

C: smudge on the roll; and

D: noticeable smudge on the roll.

⑤ Number of Coarse Protrusions on the Film Surface

After aluminum is thinly vapor deposited on the film surface, the number of coarse protrusions with 4 or more quartet circles (number per 1 mm² of the measuring area) is counted by using a binary beam interference microscope, and ranked according to the number of the coarse protrusions:

1st class: not less than 16; 2nd class: 12–15;

3rd class: 8–11; 4th class: 4–7; and

5th class: 0–3

⑥ b Value

The b value is a measured value by Hunter color difference meter. The smaller the value becomes, the smaller the discoloration due to resin deterioration becomes.

TABLE 6

|  |  | Examples | | | Comparative Examples | | | | |
|---|---|---|---|---|---|---|---|---|---|
|  |  | 7 | 8 | 9 | 10 | 11 | 12 | 13 | 14 |
| Particles | Kinds | E1 | E2 | E3 | F1 | F2 | F3 | M1 | M4 |
|  | Amounts added (Parts by weight) | 0.1 | 0.1 | 0.1 | 0.1 | 0.1 | 0.1 | 0.1 | 0.1 |
| Properties of polyester films | Surface roughness (R) (μm) | 0.021 | 0.022 | 0.023 | 0.022 | 0.023 | 0.022 | 0.022 | 0.029 |
|  | Friction coefficient μk | 0.38 | 0.40 | 0.40 | 0.37 | 0.38 | 0.38 | 0.37 | 0.39 |
|  | Abrasion-I | A | B | B | A | D | A | A | D |
|  | Abrasion-II | A | B | B | A | C | A | A | C |
|  | Coarse protrusions (Class) | 5 | 5 | 5 | 5 | 3 | 5 | 5 | 2 |
|  | b values | 3.0 | 2.9 | 2.7 | 7.2 | 6.3 | 6.0 | 9.6 | 8.1 |

EXAMPLES 10–12 AND COMPARATIVE EXAMPLES 15–19

In Examples 10, 11 and 12, the particles E1, E2 and E3 prepared in Examples 1, 2 and 3, in Comp. Examples 15, 16 and 17, the particles F1, F2 and F3 prepared in Comp. Examples 1, 2 and 3, in Comp. Example 18, the particle M1 prepared in Ref. Example 1 and in Comp. Example 19, the particle M4 prepared in Ref. Example 4 were used to prepare polyester fibers were prepared by the method as set forth below.

(Preparation of Polyester Fibers)

To dimethyl terephthalate and ethylene glycol as raw materials, the particles were added in an amount of 3 parts by weight based on 100 parts by weight of polyester and subjected to polymerization by a conventional method to thus obtain polyethyleneterephthalates in the form of tips. The dispersibility of the particles in polyesters were found good. These polyesters were subjected to spinning by an extrusion molding machine at 290° C. and the obtained unstretched fibers were subjected to two-step stretching 3 times in water of 75° C. and 96° C. to thus give polyester fibers.

Three fibers were bundled to give multifilaments, respectively and knitted fabrics were obtained by a circular interlock knitting machine, then subjected to scouring and drying. The knitted fabrics were then subjected to dyeing by the use of Diamix Black BG-FS 13% owf at a liquor ratio of 1:30 at 130° C. for 60 minutes, followed by reduction cleaning and drying to thus obtain black textile fabrics.

The dyeability of the thus obtained textile fabrics was evaluated by the method as set forth below. The evaluation results are shown in Table 7. It is confirmed from Table 7 that the synthetic resin compositions of the present invention containing the particles E1–E3 exhibit excellent dyeability and have less discoloration caused by resin deterioration. Moreover, polyester fibers obtained in Examples 10–12 were also excellent in spinnability.

(Evaluation Method of Dyeability)

1̂ Evaluation of Color Development

An L value of the textile fabrics was measured by a digital color difference calculator. The smaller the L value becomes, the deeper the color becomes.

2̂ Evaluation of Discoloration Caused by Washing and Dry Cleaning

The treatment was repeated three times according to JIS L0844 and L0860 and a change in color compared with the textile fabric was ranked by the use of a gray scale provided in JIS L0804. As the ranks become close to 5, the change in color is small.

TABLE 7

| | Particles | | Properties of polyester fibers | | |
|---|---|---|---|---|---|
| | | Amounts | Color | Change in color | |
| | Kinds | added (Parts by weight) | development L values | Washing | Dry creaning | b values |
| Example 10 | E1 | 3 | 12.9 | 4–5 | 4–5 | 3.1 |
| Example 11 | E2 | 3 | 13.0 | 4 | 4 | 2.8 |
| Example 12 | E3 | 3 | 13.0 | 4 | 4 | 2.7 |
| Comp. Ex. 15 | F1 | 3 | 13.0 | 4 | 4 | 7.0 |
| Comp. Ex. 16 | F2 | 3 | 15.0 | 3 | 3 | 6.2 |
| Comp. Ex. 17 | F3 | 3 | 13.0 | 4 | 4 | 5.6 |
| Comp. Ex. 18 | M1 | 3 | 12.9 | 4–5 | 4-5 | 9.8 |
| Comp. Ex. 19 | M4 | 3 | 17.0 | 2–3 | 2-3 | 8.1 |

EXAMPLES 13–15 AND COMPARATIVE EXAMPLES 20–25

In Examples 13, 14 and 15, the particles E1, E2 and E3 prepared in Examples 1, 2 and 3, in Comp. Examples 20, 21 and 22, the particles F1, F2 and F3 prepared in Comp. Examples 1, 2 and 3, in Comp. Example 23, the particle M1 prepared in Ref. Example 1 and in Comp. Example 24, the particle M4 prepared in Ref. Example 4 were used the prepare polyamide films and the quality of these films were evaluated. In Comp. Example 25, the particles were not used as a control. The results are shown in Table 8.

It is confirmed from Table 8 that the synthetic resin compositions of the present invention containing the particles E1, E2 and E3 have excellent film properties and exhibit less discoloration caused by resin deterioration.

(Preparation of Polyamide Films)

To 100 parts by weight of a polyamnide resin Nylon-6 comprising ε-caprolactam as a main raw material, 0.5 part by weight of each of the foregoing particles was added and mixed by Super mixer. The mixture was melted and extruded from a T die in a form of sheet, then cast on a cooling drum. The obtained films were heated at 50° C. and stretched 3.2 times to the longitudinal direction and 4 time to the lateral direction at 120° C. to thereby obtain Nylon-6 films having a thickness of 15 μm. The obtained films were subjected to corona discharge treatment in the film-forming step.

The films were evaluated with respect to transparency, anti-blocking property and anti-scratch property in the same manners as in the foregoing polyolefin films.

TABLE 8

| | Particles | | Properties of polyamide films | | | |
|---|---|---|---|---|---|---|
| | Kinds | Amounts added (Parts by weight) | Transparency % | Anti-blocking property g/10 cm² | Anti-scratch property | b values |
| Example 13 | E1 | 0.5 | 9.1 | 25 | 4.6 | 3.0 |
| Example 14 | E2 | 0.5 | 9.2 | 36 | 4.6 | 2.9 |
| Example 15 | E3 | 0.5 | 8.7 | 36 | 4.6 | 2.8 |
| Comp. Ex. 20 | F1 | 0.5 | 9.1 | 36 | 4.6 | 7.2 |
| Comp. Ex. 21 | F2 | 0.5 | 8.5 | 45 | 6.9 | 6.1 |
| Comp. Ex. 22 | F3 | 0.5 | 9.1 | 36 | 4.6 | 5.8 |
| Comp. Ex. 23 | M1 | 0.5 | 9.1 | 25 | 4.6 | 9.6 |
| Comp. Ex. 24 | M4 | 0.5 | 6.8 | 400 | 7.7 | 8.3 |
| Comp. Ex. 25 | Blank | — | 2.2 | 2600 | 1.1 | 2.6 |

Industrial Applicability

The additive for synthetic resins of the present invention is capable of providing not only synthetic resin compositions which have excellent anti-scratch property and anti-blocking property as well as excellent transparency and less discoloration caused by a deterioration of resin, but synthetic resin compositions having excellent dyeability.

What is claimed is:

1. An additive for synthetic resins which comprises composite particles (MR) which are obtained by depositing a calcium phosphate compound (R) on support particles (M) having a petaloid porous structure, the composite particles satisfying the following formulas (a)–(h);

(a) $0.1 \leq Dmr \leq 20$ (μm)
(b) $1 \leq Dmr/Dm \leq 5$
(c) $0.5 \leq Tmr1 \leq 5$ (% by weight)
(d) $0.01 \leq Tmr1/Tm1 < 1$
(e) $0.3 \leq Tmr2 \leq 3$ (% by weight)
(f) $0.01 \leq Tmr2/Tm2 < 1$
(g) $1 \leq \alpha mr \leq 5$, where $\alpha + dmr50/Dmr$
(h) $0 \leq \beta mr \leq 2$, where $\beta = (dmr90 - dmr10)/dmr50$ wherein, Dmr: Average particle diameter (μm) of the composite particles (MR) measured by a photograph of a scanning electron microscope (SEM);

Dm: Average particle diameter (μm) of the support particles (M) measured by a photograph of a scanning electron microscope (SEM);

Tmr1: Heating loss (% by weight) at 500° C. of the composite particles (MR);

Tm1: Heating loss (% by weight) at 500° C. of the support particles (M);

Tmr2: Heating loss (% by weight) at 200° C. of the composite particles (MR);

Tm2: Heating loss (% by weight) at 200° C. of the support particles (M);

αmr: Dispersion coefficient of the composite particles (MR);

dm50: 50% average particle diameter (μm) of the support-particles (M) measured by a particle size distribution tester using a microtrack FRA laser;

dmr50: 50% average particle diameter (μm) of the composite particles (MR) measured by a particle size distribution tester using a microtrack FRA laser;

βmr: Sharpness of the composite particles;

dm90: 90% particle diameter of the total support particles (M) passed through a sieve measured by a particle size distribution tester using a microtrack FRA laser;

dmr90: 90% particle diameter of the total composite particles (MR) passed through a sieve measured by a particle size distribution tester using a microtrack FRA laser;

dm10: 10% particle diameter of the total support particles (M) passed through a sieve measured by a particle size distribution tester using a microtrack FRA laser;

dmr10: 10% particle diameter of the total composite particles (MR) passed through a sieve measured by a particle size distribution tester using a microtrack FRA laser.

2. The additive for synthetic resins of claim 1, wherein the composite particles (MR) satisfies the following formulas:

(i) $1 \leq \alpha mr \leq 2$, where $\alpha = dmr50/Dmr$ (j) $0 \leq \beta mr \leq 1$, where $\beta = (dmr90-dmr10)/dmr50$.

3. The additive for synthetic resins of claim 1, wherein an atomic ratio Ca/P of the composite particles (MR) is not more than 5.56.

4. The additive for synthetic resins of claim 1, wherein an atomic ratio Ca/P of the composite particles (MR) is not more than 3.33.

5. The additive for synthetic resins of claim 1, wherein the calcium phosphate compound (R) is hydroxyapatite of $Ca_{10}(PO_4)_6 \cdot (OH)_2$.

6. The additive for synthetic resins of any one of claims 1 to 5, wherein the support particles (M) and the composite particles (MR) satisfy the following formulas:

(k) $3 \leq Smr \leq 300$ (m²/g)

(l) $0.01 \leq Smr/Sm < 1$ (m) $3 \leq Smr/S1 \leq 125$ wherein

Smr: BET specific surface area (m²/g) of the composite particles (MR) measured by a nitrogen adsorbing method;

Sm: BET specific surface area (m²/g) of the support particles (M) measured by a nitrogen adsorbing method;

S1: Theoretical specific area (m²/g) by a spherical conversion of the composite particles (MR), where it is calculated by the following equation;

$$(1/w)/(4\pi r^3/3)*4\pi r^2 = 3/wr \ (m^2/g),$$

wherein

W: True specific gravity of particles (according to JIS K 5101)

r: Average radius ($\mu$m) of particles measured by a photograph of a scanning electron microscope (SEM).

7. A synthetic resin composition containing an additive for synthetic resins defined by claim 1.

8. The synthetic resin composition of claim 7, wherein the synthetic resin composition is a synthetic resin film or a synthetic resin fiber.

* * * * *